United States Patent

Plunkett

[19]

[11] Patent Number: 6,032,931
[45] Date of Patent: Mar. 7, 2000

[54] APPARATUS FOR SELECTIVE AERATION

[75] Inventor: Leo Junior Plunkett, Cushing, Okla.

[73] Assignee: Ramco Sales, Inc., Cushing, Okla.

[21] Appl. No.: 08/974,370

[22] Filed: Nov. 19, 1997

[51] Int. Cl.[7] ..................................................... B01F 3/04
[52] U.S. Cl. ........................... 261/77; 210/220; 261/79.2; 261/93; 261/123
[58] Field of Search .............................. 261/77, 79.2, 84, 261/87, 93, 123; 210/220, 221.2

[56] References Cited

U.S. PATENT DOCUMENTS

| | | |
|---|---|---|
| 3,691,230 | 9/1972 | Wesselingh ................................ 261/93 |
| 3,865,721 | 2/1975 | Kaelin ....................................... 261/93 |
| 3,969,446 | 7/1976 | Franklin, Jr. . |
| 4,156,712 | 5/1979 | Kanai et al. ............................... 261/84 |
| 4,183,787 | 1/1980 | Roesler et al. ............................ 261/77 |
| 4,230,570 | 10/1980 | Irving ....................................... 261/77 |
| 4,272,461 | 6/1981 | Franklin, Jr. . |
| 4,336,144 | 6/1982 | Franklin, Jr. . |
| 4,374,030 | 2/1983 | Franklin, Jr. . |
| 4,680,119 | 7/1987 | Franklin, Jr. . |
| 5,562,821 | 10/1996 | Gutierrez-Collazo ..................... 261/93 |
| 5,755,976 | 5/1998 | Kortmann ................................. 261/77 |

FOREIGN PATENT DOCUMENTS

| | | | |
|---|---|---|---|
| 1149377 | 12/1957 | France ..................................... | 261/77 |
| 2731105 | 1/1979 | German Dem. Rep. ................ | 261/77 |

*Primary Examiner*—C. Scott Bushey
*Attorney, Agent, or Firm*—Fellers, Snider, Blankenship, Bailey & Tippens, P.C.

[57] ABSTRACT

An apparatus for selectively aerating a pond. The inventive apparatus preferably includes a first conduit for receiving a fluid from an upper portion of a pond without substantially disturbing a fluid material contained in a lower portion of the pond; a gas delivery conduit for delivering a gas into the apparatus; and a discharge conduit, at least partially positioned in the receiving conduit, for discharging the fluid and the gas into the upper portion of the pond without substantially disturbing the fluid material contained in the lower portion of the pond. An inventive method includes the steps of (a) positioning the inventive apparatus in the pond such that: a fluid opening provided in the receiving conduit is positioned in the upper portion of the pond; a discharge opening provided in the discharge conduit is positioned in the upper portion of the pond; and the discharge opening of the discharge conduit is positioned above the fluid opening of the receiving conduit and (b) delivering gas to the apparatus to thereby aerate the upper portion of the pond.

17 Claims, 4 Drawing Sheets

APPARATUS FOR SELECTIVE AERATION

FIELD OF THE INVENTION

The present invention relates to apparatuses and methods for aerating liquids and other fluid compositions. More particularly, but not by way of limitation, the present invention relates to apparatuses and methods for aerating only selected strata of waste treatment lagoons and of other fluid ponds.

BACKGROUND OF THE INVENTION

Among other things, aeration processes are commonly employed to accelerate the bacteriological decomposition of fluid wastes and to prevent algae formation on the surfaces of stagnant ponds and pools. As used herein and in the claims, the term "aeration" can involve the introduction of any type of gas into any type of fluid. Most "aeration" processes involve the use of air.

U.S. Pat. No. 3,969,446 discloses an aerator comprising: an elongate tube having an open upper end and an open lower end; a plurality of turbines mounted in the tube for free rotation; an air header positioned in the bottom of the tube; and flow restriction collars mounted in the tube beneath at least some of the turbines. When the device is vertically submerged in a pond, the upward flow of air through the tube causes the pond fluid to circulate into the bottom and out of the top of the tube. The upward flow of air and fluid through the tube also causes the turbines to rotate. The turbines generate turbulence in the tube and thereby operate to reduce the size, increase the number, and improve the dispersion of the gas bubbles flowing through the tube. The flow restriction collars also increase the amount of turbulence generated within the tube. To further improve aeration efficiency, the turbines employed in the device are preferably configured to rotate in different directions and/or at different speeds.

U.S. Pat. No. 4,374,030 discloses an aeration device which is particularly well-suited for the treatment of waste fluids containing hair and/or other fibrous solid materials and for separating a liquid or solid disperse phase from a continuous liquid phase. The device comprises: a vertical, elongate inner tube have an open upper end; a plurality of turbines mounted for free rotation within the inner tube; a vertical outer tube surrounding the inner tube and having an open upper end positioned above the upper end of the inner tube; a pair of horizontally extending fluid openings provided through the wall of the outer tube near the lower end thereof; a plurality of flow restriction venturis mounted in the inner tube at positions immediately upstream of the turbines; a base member to which the lower ends of the inner and outer tubes are attached and which seals the lower ends of the inner and outer tubes; an air pipe for introducing air into the lower end of the inner tube; and a liquid line extending into the lower interior portion of the inner tube for removing liquid therefrom. The upward flow of air through the inner tube and then through the upper portion of the outer tube causes the turbines to rotate and carries fluid out of the top of the outer tube. The flow of air and fluid out of the top of the outer tube, in turn, operates to draw additional fluid into the device through the openings provided adjacent the bottom of the outer tube. As the fluid flows upward between the outer and inner tubes, the air bubbles exiting the upper end of the inner tube contact the fluid and push the disperse particles or droplets contained in the fluid toward the interior wall of the outer tube. As a result, the fluid separates into two streams. The first stream contains the disperse particles/droplets and is carried by the air stream upward and out of the top of the outer tube. The second fluid stream contains substantially none of the disperse phase and flows downward through the top of the inner tube. A portion of the second stream is eventually removed from the bottom of the inner tube by means of the liquid conduit.

The entire disclosure of U.S. Pat. No. 3,969,446 and the entire disclosure of U.S. Pat. No. 4,374,030 are incorporated herein by reference.

Wastewater lagoons and other treatment ponds tend to stratify into a plurality of layers. These typically include: (a) a top fluid layer having a sufficiently high dissolved oxygen content to support the aerobic digestion of contaminants contained in the fluid; (b) a middle fluid layer having a low dissolved oxygen content (i.e., typically one part per million or less) capable of supporting only facultative bacteria; and (c) a bottom fluid layer wherein only anaerobic digestion occurs. The bottom fluid layer typically contains a large amount of sludge or silt.

In some cases, it is desirable to completely destratify and aerate the pond in order to promote aerobic digestion throughout the waste material. As will be apparent to those skilled in the art, devices of the type disclosed in U.S. Pat. Nos. 3,969,446 and 4,374,030 are highly effective and advantageous for completely destratifying and aerating a pond.

However, in other cases(e.g., in waste water ponds associated with swine farms), the anaerobic digestion processes occurring near the bottom of the pond are relatively complete and efficient. Thus, the bottom layer of the pond can be more efficiently digested by these anaerobic, processes than by mixing and aerating the bottom layer with the upper and middle layers of the pond.

Thus, a need presently exists for an apparatus and method which will effectively and efficiently aerate the upper layer (s) of a pond but will leave the bottom layer of the pond substantially undisturbed (i.e., will not substantially aerate the bottom layer of the pond and/or substantially interfere with the anaerobic activity occurring in the bottom layer).

SUMMARY OF THE INVENTION

The present invention satisfies the needs and resolves the problems mentioned above. The present invention provides an apparatus and method which are effective for selectively and efficiently aerating one or more upper layers of a pond while leaving one or more lower layers of the pond substantially undisturbed. Thus, in applications where anaerobic microorganisms and processes are most effective for breaking down contaminants contained in the bottom layer(s) of the pond, the inventive system greatly reduces the number of aeration units, greatly reduces the amount of air flow, and reduces the amount of time required to effectively treat the pond. By reducing the gas flow and the time required to effectively treat the pond and by introducing the gas into the pond at a shallower depth, the inventive system also provides substantial horsepower and energy savings.

As used herein and in the claims, the term "pond" refers to generally any body of fluid.

In one aspect, the present invention provides an apparatus for aerating a fluid, the apparatus comprising: first conduit means for conducting the fluid downward, the first conduit means having a first conduit opening for receiving the fluid into the first conduit means; second conduit means, at least partially positioned within the first conduit means, for conducting the fluid upward, the second conduit means having an inlet opening for receiving the fluid from the first conduit means and the second conduit means having a discharge opening for discharging the fluid from the apparatus; and gas delivery means for delivering a gas into the apparatus. The inlet opening of the second conduit means is positioned below the first conduit opening. The discharge opening of the second conduit means is positioned above the first conduit opening.

In another aspect, the present invention provides an apparatus for selectively aerating a portion of a pond, the apparatus comprising: receiving means for receiving a fluid from an upper portion of the pond without substantially disturbing a fluid material contained in a lower portion of the pond; gas delivery means for delivering a gas into the apparatus; and discharge means for discharging the fluid and the gas into the upper portion of the pond without substantially disturbing the fluid material in the lower portion of the pond.

In yet another aspect, the present invention provides a method for selectively aerating a fluid in an upper portion of a pond without substantially disturbing a fluid material in a lower portion of the pond. The inventive method comprises the steps of (a) positioning an apparatus in the pond and (b) delivering gas into the apparatus. The apparatus comprises: receiving means for receiving the fluid from the upper portion of the pond without substantially disturbing the fluid material in the lower portion of the pond; gas delivering means for delivering the gas into the apparatus; and discharge means for discharging the fluid and the gas into the upper portion of the pond without substantially disturbing the fluid material in the lower fluid portion of the pond.

Further objects, features, and advantages of the present invention will be apparent upon examining the accompanying drawings and upon reading the following description of the preferred embodiments.

DESCRIPTION OF THE PREFERRED EMBODIMENTS

Figure 1:
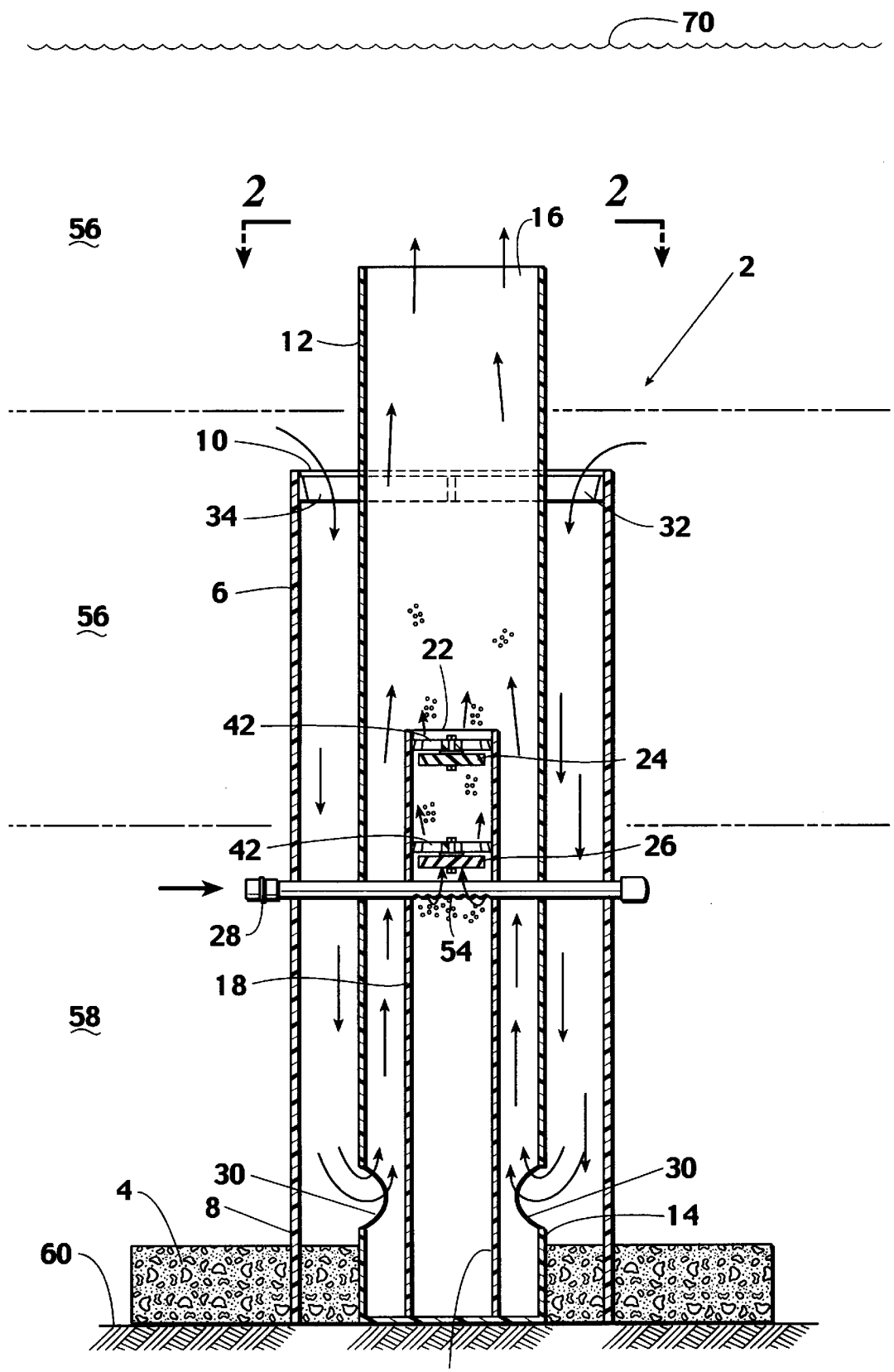
FIG. 1 provides a cutaway elevational front view of an embodiment 2 of the inventive apparatus.
Figure 2:
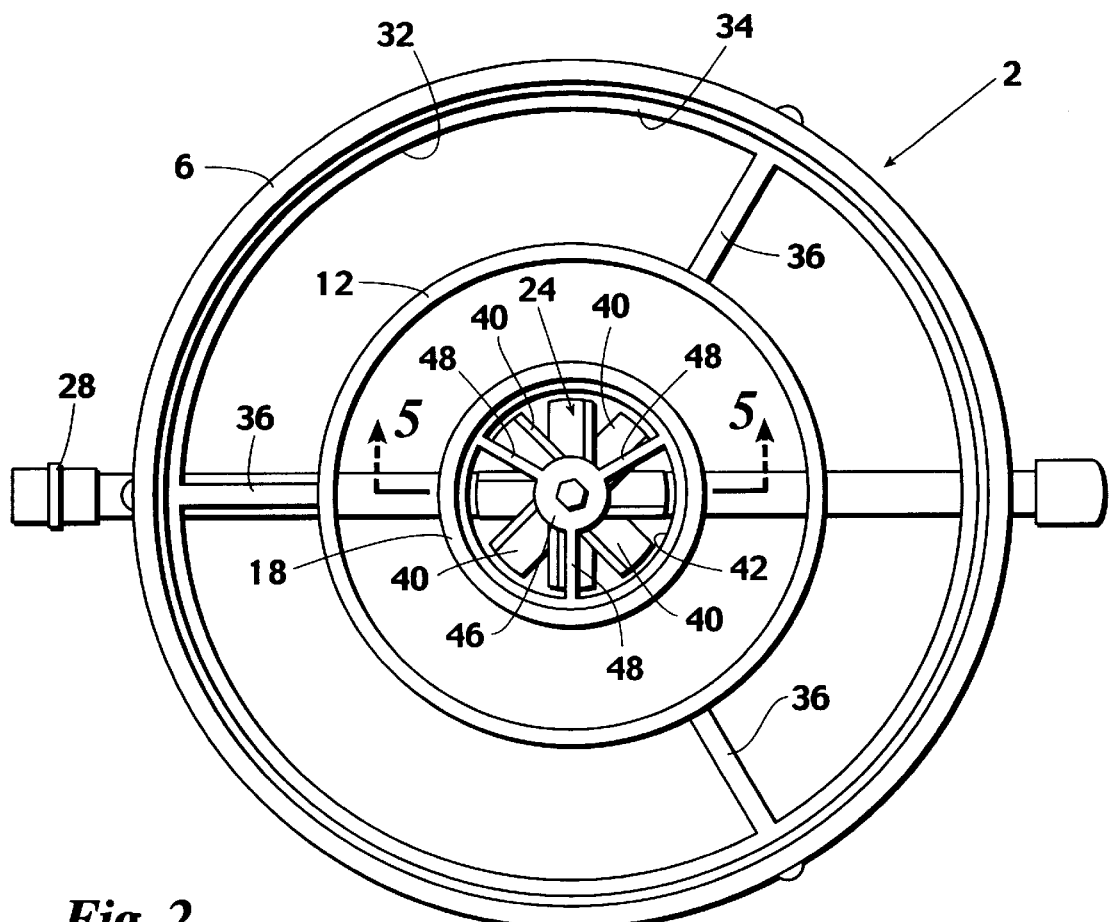
FIG. 2 provides a top view of apparatus 2 as seen from perspective 2—2 shown in FIG. 1.
Figure 5:
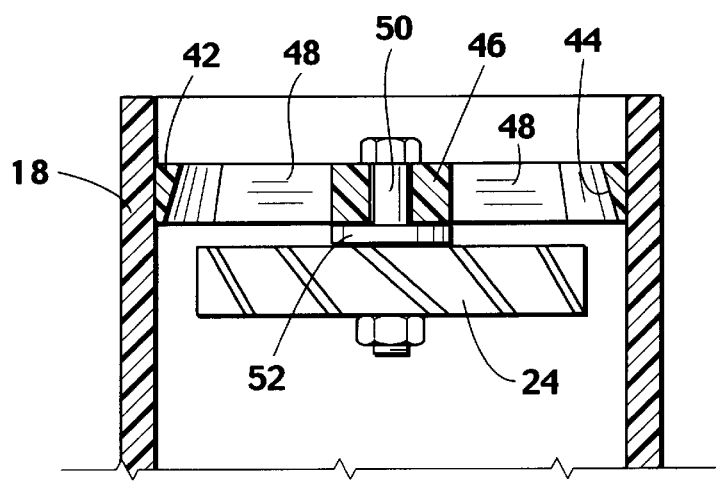
FIG. 5 provides a cutaway view of inventive apparatus 2 as seen from perspective 5—5 shown in FIG. 2.

An embodiment 2 of the inventive aeration apparatus is depicted in FIGS. 1 and 2. Inventive apparatus 2 comprises: a base 4; an outer conduit (preferably a cylindrical tube) 6 having a lower end 8 secured to base 4 and an open upper end 10; an intermediate conduit (preferably a cylindrical tube) 12 concentrically positioned inside outer tube 6 and having a lower end 14 secured to base 4 and an open upper end 16; an inner conduit (preferably a cylindrical tube) 18 concentrically positioned inside intermediate tube 12 and having a lower end 20 secured to base 4 and an open upper end 22; one or more turbines (preferably at least an upper turbine 24 and a lower turbine 26) rotatably mounted within inner tube 18; and a gas/air pipe or other conduit 28 extending through outer and intermediate tubes 6 and 12 and into inner tube 18.

Base 4 is preferably a concrete slab or other heavy structure which will rest on the bottom 60 of the pond. Cylindrical tubes 6, 12, and 18 are preferably attached to base 4 such that the lower ends 8, 14, and 20 of these tubes are completely sealed.

Tubes 6, 12, and 18 are preferably sized such that: (a) the height of outer tube 6 exceeds that of inner tube 18 but is less than the height of intermediate tube 12; (b) when inventive apparatus 2 is placed in use on the bottom 60 of a pond, the upper end 10 of outer tube 6 is spaced a sufficient distance above the anaerobic bottom layer(s) 58 of the pond such that layer(s) 58 is/are not substantially disturbed; (c) the upper end 16 of intermediate tube 12 is spaced a sufficient distance above the upper end 10 of outer tube 6 such that the fluid flowing from the upper end 16 of intermediate tube 12 does not flow directly back into outer tube 6 and does not otherwise obstruct the flow of fluid into outer tube 6; (d) the upper end 22 of inner tube 18 is spaced sufficiently below the upper end 16 of intermediate tube 12 to allow thorough contacting and mixing of the gas phase and liquid phase to occur in the upper portion of intermediate tube 12; and (e) the upper end 16 of intermediate tube 12 will preferably be spaced below the pond surface 70 a distance equal to or greater than the diameter of intermediate tube 12. The height of intermediate tube 12 is preferably in the range of from about 4 to about 1.25 times the height of inner tube 18. The height of intermediate tube 12 is most preferably in the range of from about 2 to about 1.5 times the height of inner tube 18.

Intermediate tube 12 has a pair of diametrically opposed, horizontally extending fluid. openings 30 formed therein. Fluid openings 30 are preferably positioned below lower turbine 26. Fluid openings 30 are most preferably positioned adjacent the top of base 4.

The upper portion of intermediate tube 12 is preferably supported by a circular brace structure 32. Brace 32 comprises: an outer venturi-type collar 34 secured on the interior of outer tube 6; and a plurality of radial support bars/spokes 36 extending from outer collar 34 to intermediate tube 12.

Each of turbines 24 and 26 has an outside diameter which is less than the inside diameter of inner tube 18. Each turbine preferably includes a plurality of turbine blades 40. Inner tube 18 provides a housing wherein turbines 24 and 26 are rotatably mounted.

The blade orientation of turbine 24 is preferably substantially opposite the blade orientation of turbine 26 whereby turbines 24 and 26 will rotate in opposite directions. Alternatively, or in addition, the angle of the blades of turbine 24 can be different from the angle of the blades of turbine 26 such that turbines 24 and 26 will rotate at different speeds. Using different rotational directions and/or speeds generates greater turbulence and thus enhances the breakup of air bubbles rising through the turbines, promotes the production of smaller bubbles, and increases the mixing and contacting efficiency of the inventive apparatus.

Inventive apparatus 2 also preferably includes one or more venturi rings 42 secured on the interior wall of inner tube 18. Each of venturi rings 42 includes a tapered interior wall 44 which slightly restricts the flow of material through inner tube 18 and thus increases the amount of turbulence generated in apparatus 2.

Inventive apparatus 2 preferably includes a separate venturi ring 42 positioned above each of turbines 24 and 26. Turbines 24 and 26 are most preferably mounted in inner tube 18 by means of hubs 46 with which are centrally positioned in venturi rings 42. Hubs 46 are supported by a plurality of radial bars/spokes 48 extending from venturi rings 42. Turbines 24 and 26 are rotatably mounted on shafts 50 extending downwardly from hubs 46. Spacers 52 are preferably positioned on shafts 50 between hubs 46 and turbines 24 and 26 to protect the turbines from wear. As will be understood by those skilled in the art, spacers 52 are preferably formed from high density polyethylene or some other low friction material. The diameters of turbines 24 and 26 are preferably slightly less than the inside diameter of venturi rings 42.

Gas conduit 28 extends to inventive apparatus 2 from an air compressor or other desired gas source (not shown). The gas is delivered to the interior of inner tube 12 by means of a plurality of apertures 54 provided in conduit 28. Conduit 20 is preferably positioned beneath lower turbine 26 such that the air bubbles rising from apertures 54 mix with fluid contained in inner tube 18 and carry fluid upward through turbines 24 and 26 and venturi rings 42. The upward flow of gas and fluid in inner tube 18 causes turbines 24 and 26 to rotate as mentioned above.

As also indicated above, the turbulence produced by turbines 24 and 26 and by venturi rings 42 greatly increases the aeration efficiency of inventive apparatus 2 by promoting the production of smaller gas bubbles, by greatly increasing the amount of gas/liquid mixing and contact occurring in the apparatus, and by greatly increasing the effective contacting area between the liquid and gas phases.

Although inventive apparatus 2 preferably utilizes two turbines and two venturi rings, generally any desired number of turbines and rings can be used in the apparatus. Such turbines and venturi rings can be used separately or in conjunction with each other. Additionally, when a turbine and venturi ring are used in conjunction, the venturi ring can optionally be positioned. upstream rather than downstream of the turbine. Further, turbines 24 and 26 can optionally be rotatably mounted on a single shaft (note shown) rather than on separate shafts 50.

In operation, the gas flowing from apertures 54 mixes with and carries an amount of fluid through turbines 24 and 26 and venturi rings 42 and out of the upper end 22 of inner tube/housing 18. The gas bubble stream then carries an additional amount of fluid out of the upper end 16 of intermediate tube 12. The flow of gas and fluid from intermediate tube 12 creates additional mixing turbulence above inventive apparatus 2 and causes additional pond fluid to be drawn into the upper end 10 of outer tube 8.

The fluid drawn into outer tube 6 flows downward between tubes 6 and 12 and then into the fluid openings 30 provided near the bottom end of intermediate tube 12. The fluid next flows upward between intermediate tube 12 and inner tube 18. As this fluid reaches the upper end 22 of inner tube 18, the air bubbles flowing from the top of inner tube 18 contact the fluid and carry any particulate materials contained in the fluid toward the interior wall of intermediate tube 12 The fluid is thus divided into two fluid streams. The first is a small fluid stream, containing relatively few particulates, which flows into the upper end 22 of inner tube 18. This small stream replaces fluid carried by the gas out of inner tube 18. The second fluid stream mixes with the gas in the upper portion of intermediate tube 12 and is carried by the gas out of the upper end 16 of tube 12.

The resulting circulation of fluid into the upper end 10 of tube 6 and out of the upper end 16 of tube 12 both aerates and destratifies the fluid contained in the upper portion(s) 56 of the pond. However, the upper end 10 of outer tube 6 is spaced a sufficient distance above the bottom layer(s) 58 of the pond such that layer(s) 58 are not substantially blended and aerated with the upper portion of the pond. Thus, the anaerobic processes occurring in lower layer(s) 58 are not substantially disturbed.

Figure 3:
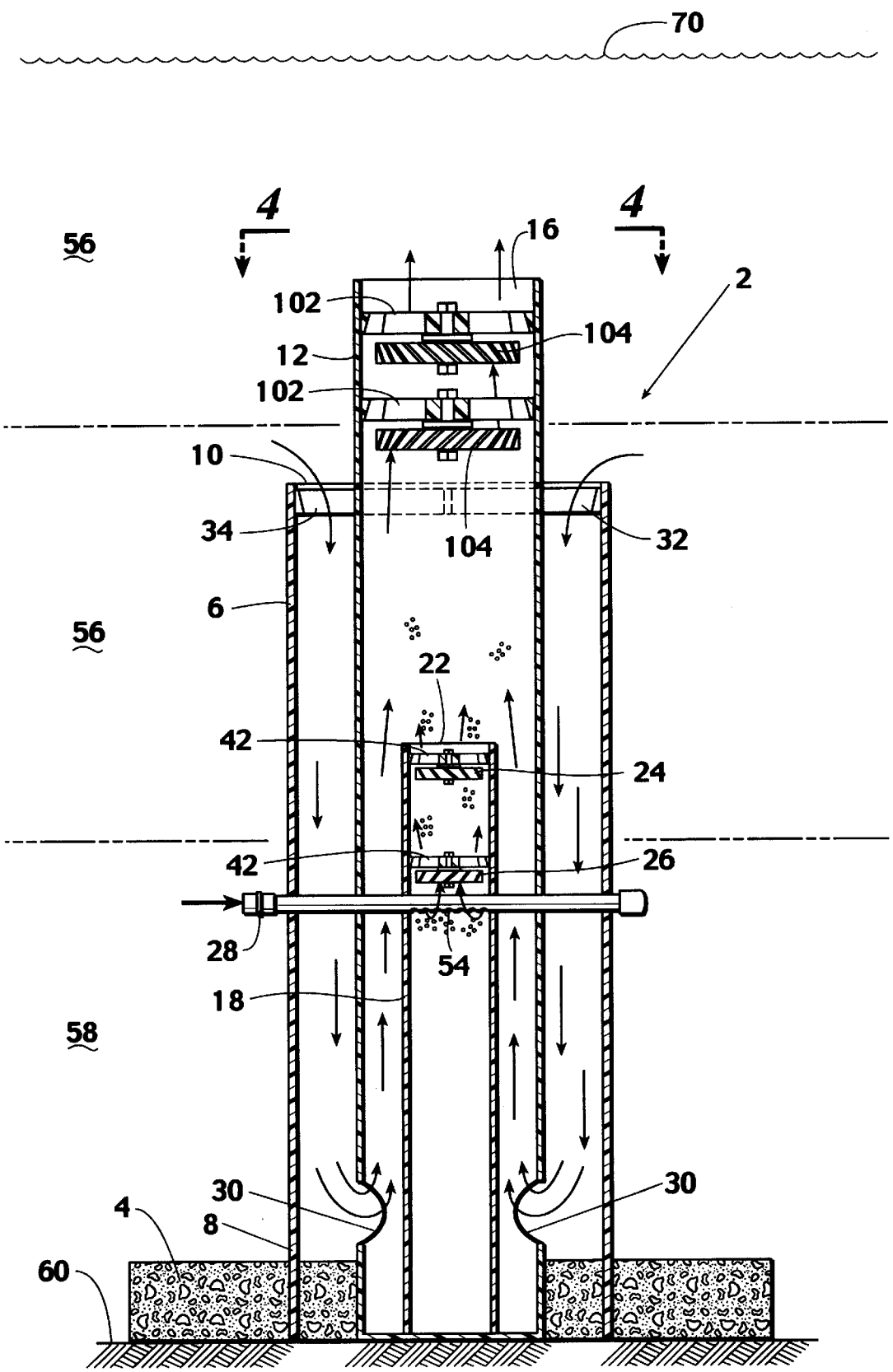
FIG. 3 provides a cutaway elevational front view of an alternative embodiment 100 of the inventive apparatus.
Figure 4:
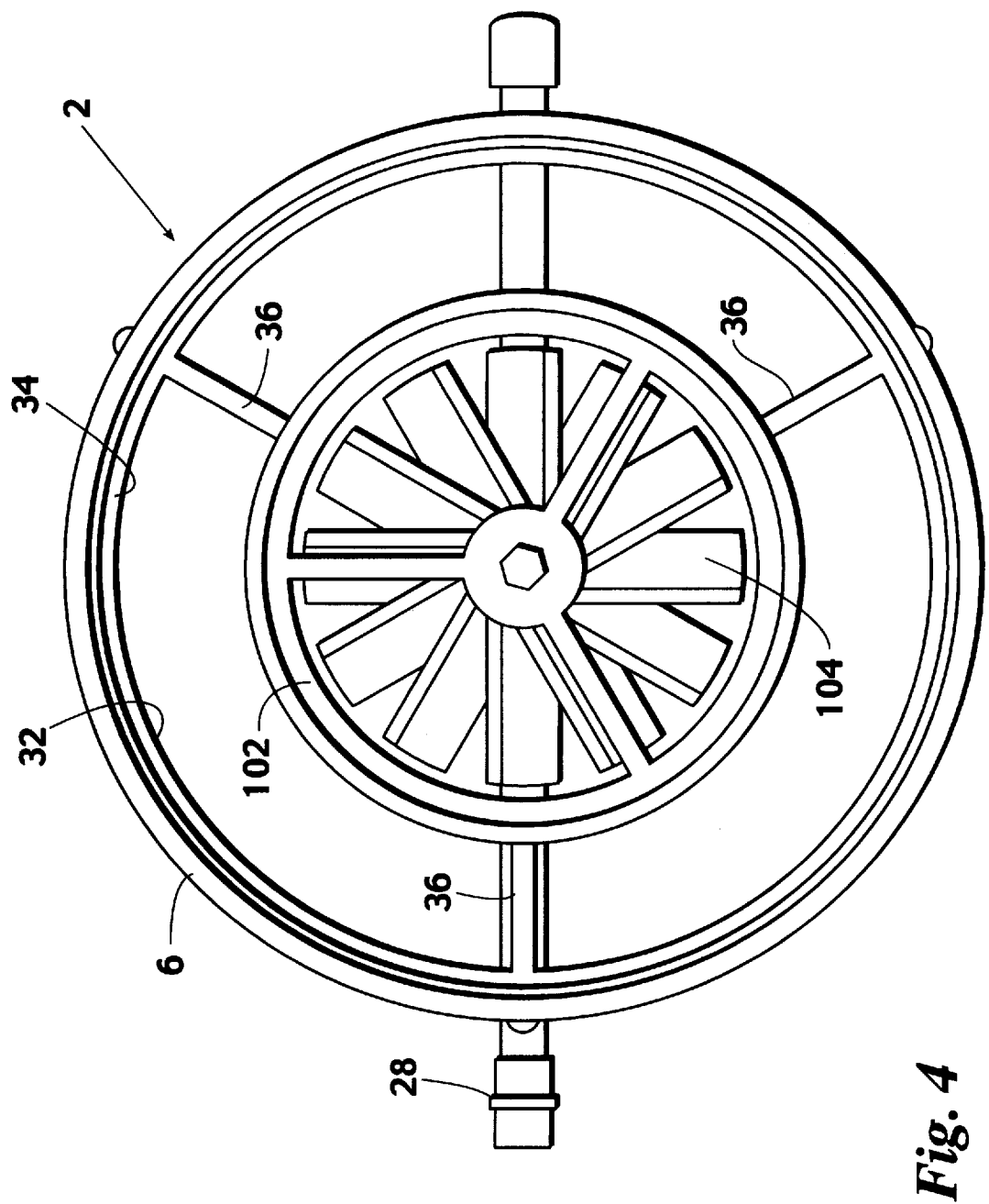
FIG. 4 provides a top view of apparatus 100 as seen from perspective 4—4 shown in FIG. 3.

An alternative embodiment 100 of the inventive apparatus is depicted in FIGS. 3 and 4. Apparatus 100 is essentially identical to inventive apparatus 2 except that apparatus 100 includes one or more venturi rings 102 and/or turbines 104 positioned in intermediate tube 12 above the upper end 22 of inner tube 18. Venturi rings 102 and turbines 104 promote additional turbulence and gas/liquid contact.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for aerating a fluid comprising:

first conduit means for conducting said fluid downward, said first conduit means having a first conduit opening for receiving said fluid into said first conduit means;

second conduit means, at least partially positioned within said first conduit means, for conducting said fluid upward, said second conduit means having an inlet opening for receiving said fluid from said first conduit means and said second conduit means having a discharge opening for discharging said fluid from said apparatus;

said inlet opening being positioned below said first conduit opening;

said discharge opening being positioned above said first conduit opening;

gas delivery means for delivering a gas into said apparatus; and contract promoting means, positioned in said second conduit means, for promoting contact between said gas and said fluid, said contact promoting means including a housing positioned in said second conduit, said housing having a top opening positioned below said discharge opening.

2. The apparatus of claim 1 wherein said gas delivery means is operable for delivering said gas into said housing.

3. The apparatus of claim 1 wherein said contact promoting means further comprises at least one turbine rotatably mounted in said housing.

4. The apparatus of claim 1 wherein said contact promoting means further comprises at least one flow restricting means, positioned in said housing, for restricting a flow of said gas and said fluid.

5. The apparatus of claim 4 wherein said contact promoting means further comprises a turbine mounted for free rotation in said housing beneath said flow restricting means and wherein said gas delivering means is operable for delivering said gas into said housing beneath said turbine.

6. An apparatus for aerating a fluid comprising:

a first vertical conduit having an uppermost end and a lowermost end;

a second vertical conduit having an uppermost end, a lowermost end, and an interior, said second vertical conduit being positioned within said first vertical conduit and projecting beyond said uppermost end of said first vertical conduit such that said uppermost end of said second vertical conduit is spaced above said uppermost end of said first vertical conduit;

a gas supply structure having at least one gas delivery opening in fluid communication with said interior of said second vertical conduit; and a base extending radially outward from said lowermost end of said first vertical conduit and wherein said base and said first and second vertical conduits are fully submersible in said fluid, wherein said uppermost end of said first vertical conduit is open for receiving said fluid and said uppermost end of said second vertical conduit is open for discharging said fluid.

7. The apparatus of claim 6 wherein said first and said second vertical conduits are substantially cylindrical.

8. The apparatus of claim 7 wherein said first and second vertical conduits are substantially concentric.

9. The apparatus of claim 6 wherein said lowermost ends of said first and said second vertical conduits are sealed and at least one opening is provided in said second vertical conduit adjacent to said base for receiving said fluid from said first vertical conduit.

10. The apparatus of claim 6 wherein said first vertical conduit is operable for receiving said fluid only at said uppermost end of said first vertical conduit.

11. The apparatus of claim 6 further comprising a housing positioned in said second vertical conduit wherein said housing has an interior and said gas delivery opening is in fluid communication with said interior of said housing.

12. The apparatus of claim 11 wherein said housing has a top opening spaced below said uppermost end of said second vertical conduit.

13. The apparatus of claim 12 wherein said second vertical conduit has a height, said housing has a height, and said height of said second vertical conduit is in the range of from about 2 to about 1.5 times said height of said housing.

14. An apparatus for aerating a fluid comprising:

a first vertical conduit having an uppermost end and a lowermost end;

a second vertical conduit having an uppermost end, a lowermost end, and an interior, said second vertical conduit being positioned within said first vertical conduit and projecting beyond said uppermost end of said first vertical conduit such that said uppermost end of said second vertical conduit is spaced above said uppermost end of said first vertical conduit;

a gas supply structure having at least one gas delivery opening in fluid communication with said interior of said second vertical conduit; and a housing positioned in said second vertical conduit wherein said housing has an interior and said delivery opening is in fluid communication with said interior of said housing, wherein said uppermost end of said first vertical conduit is open for receiving said fluid, said uppermost end of said second vertical conduit is open for discharging said fluid, and said housing is a third vertical conduit having a lowermost end and an uppermost end and said gas supply structure is operable for delivering a gas into said interior of said housing such that said gas is discharged from said uppermost end of said housing.

15. The apparatus of claim 14 wherein said gas is air.

16. The apparatus of claim 14 wherein said lowermost ends of said first, said second, and said third vertical conduits are sealed.

17. The apparatus of claim 14 further comprising means, positioned in said housing, for promoting contact between said gas and said fluid.

* * * * *